United States Patent
Uchiyama

[11] Patent Number: 5,802,496
[45] Date of Patent: Sep. 1, 1998

[54] BUSINESS TRANSACTION DATA ACCUMULATING SYSTEM

[75] Inventor: Katsuhiko Uchiyama, Fuchu, Japan

[73] Assignee: Fujitsu Limited, Kanagawa, Japan

[21] Appl. No.: 617,740

[22] Filed: Nov. 26, 1990

[30] Foreign Application Priority Data

Nov. 27, 1989 [JP] Japan ..................... 1-308410

[51] Int. Cl.$^6$ .................................................. G06F 17/60
[52] U.S. Cl. ................... 705/21; 395/185.09; 371/20.1
[58] Field of Search ................................. 364/405, 401; 371/16.3, 8.2, 20.1; 705/21; 395/185.09

[56] References Cited

U.S. PATENT DOCUMENTS

| | | | |
|---|---|---|---|
| 4,003,030 | 1/1977 | Takagi et al. | 340/172.5 |
| 4,750,120 | 6/1988 | Takahashi | 364/405 |
| 4,841,442 | 6/1989 | Hosoyama | 364/405 |
| 5,056,090 | 10/1991 | Kubota | 371/8.2 |
| 5,060,185 | 10/1991 | Naito et al. | 364/900 |
| 5,173,689 | 12/1992 | Kusano | 340/827 |
| 5,210,740 | 5/1993 | Anzai et al. | 370/16 |

FOREIGN PATENT DOCUMENTS

| | | | |
|---|---|---|---|
| 0164467 | 12/1981 | Japan | 364/405 |
| 0194261 | 11/1984 | Japan | 364/405 |

OTHER PUBLICATIONS

"Nixdorf computer introduces new point-of-service terminal" Trade name POS 2000, Nixdorf Computer Corp. Oct. 16, 1989 U.S.A.

Primary Examiner—David R. Hudspeth
Assistant Examiner—Joseph Thomas
Attorney, Agent, or Firm—Nikaido, Marmelstein, Murray & Oram LLP

[57] ABSTRACT

A business transaction data accumulating system having a plurality of POS terminals and an accumulating device. Each POS terminal includes a failure detecting device for detecting a communication line failure and a recording device for recording business transaction data if a communication line failure is detected. The accumulating device includes a reading device for reading the data which the recording device has recorded and an accumulating device for accumulating the data which the reading device has read. This scheme constitutes a reliable business transaction data accumulating system with a backup arrangement providing against line failures.

6 Claims, 8 Drawing Sheets

5,802,496

BUSINESS TRANSACTION DATA ACCUMULATING SYSTEM

FIELD OF THE INVENTION

The present invention relates to a business transaction data accumulating system which is installed in a supermarket or like business establishment and is used to accumulate data on business transactions taking place between the establishment and its customers.

BACKGROUND OF THE INVENTION

In a typical supermarket utilizing a conventional business transaction data accumulating system, a plurality of point-of-sale (POS) terminals are used to register data on business transactions taking place on the premises. Employees enter into these POS terminals the data on the business transactions with the customers. Specifically, the bar code on each product bought by a customer is read by a bar code reader attached to a POS terminal. With the bar code entered, the POS terminal accordingly retrieves the price and name of the product from an internal file or from a file of a host computer reached via a communication line. The price and other retrieved relevant data items are displayed on a display unit of the POS terminal and printed simultaneously on a receipt and a journal sheet.

Where a transaction involves a plurality of products, the above process is repeated as many times as needed and the price data retrieved from the file is added up accordingly. When a TOTAL key of the POS terminal is pressed, the total price of the multiple products is computed and displayed on the display unit while being printed simultaneously on the receipt and journal sheet. When the cash received from the customer is entered into the POS terminal, any change that may result is computed and displayed. The employee at the terminal gives the customer the change indicated. For a plurality of customers, the above-described process is repeated as well.

A plurality of such POS terminals are connected to a host computer or a terminal controller. The host computer accumulates the data on business transactions sent from its terminals. The number of units of each product sold, the sales amount thereof and the total sales of all products sold are accumulated for each business day.

The typical conventional business transaction data accumulating system described above has a plurality of POS terminals connected via a communication line to the host computer that accumulates the business transaction data gathered by the terminals. One disadvantage of that system is that if the communication line breaks down, no data can be forwarded over that line to the host computer for accumulation. Accumulation of business transaction data provides management not only with sales figures but also with vital information for devising a daily marketing strategy. Given the importance of the system, it is mandatory to install a backup system that takes over in case of a communication line breakdown. In addition to the disconnected communication line, a host computer failure also makes it impossible to accumulate sales data.

SUMMARY OF THE INVENTION

It is therefore an object of the present invention to provide a business transaction data accumulating system capable of accumulating business transaction data even if a disconnection develops on the communication line connecting the accumulating device to the POS terminals of the system.

It is another object of the present invention to provide a business transaction data accumulating system capable of accumulating business transaction data even if a failure occurs in the accumulating device of the system that accumulates the data forwarded from the POS terminals thereof.

In accordance with an aspect of the present invention, there is provided a business transaction data accumulating system including a plurality of business transaction data entry device, a business transaction data accumulating device and a communication line connecting these device, the business transaction data entry device receiving business transaction data, the business transaction data accumulating device accumulating the business transaction data entered through each data entry device, each of the data entry device includes a failure detecting device for detecting any failures that may occur on the communication line and a recording device for recording on a suitable medium the business transaction data entered through the data entry device upon detection of a failure by the failure detecting device.

The business transaction data accumulating device preferably includes a reading device for reading business transaction data from the medium and an accumulating device for accumulating the business transaction data which the reading device has read from the medium.

The above and other objects, features and advantages of the present invention and the manner of realizing them will become more apparent, and the invention itself will be understood, from a study of the following description and appended claims with reference to the attached drawings showing some preferred embodiments of the invention.

DESCRIPTION OF THE PREFERRED EMBODIMENTS

Figure 1:
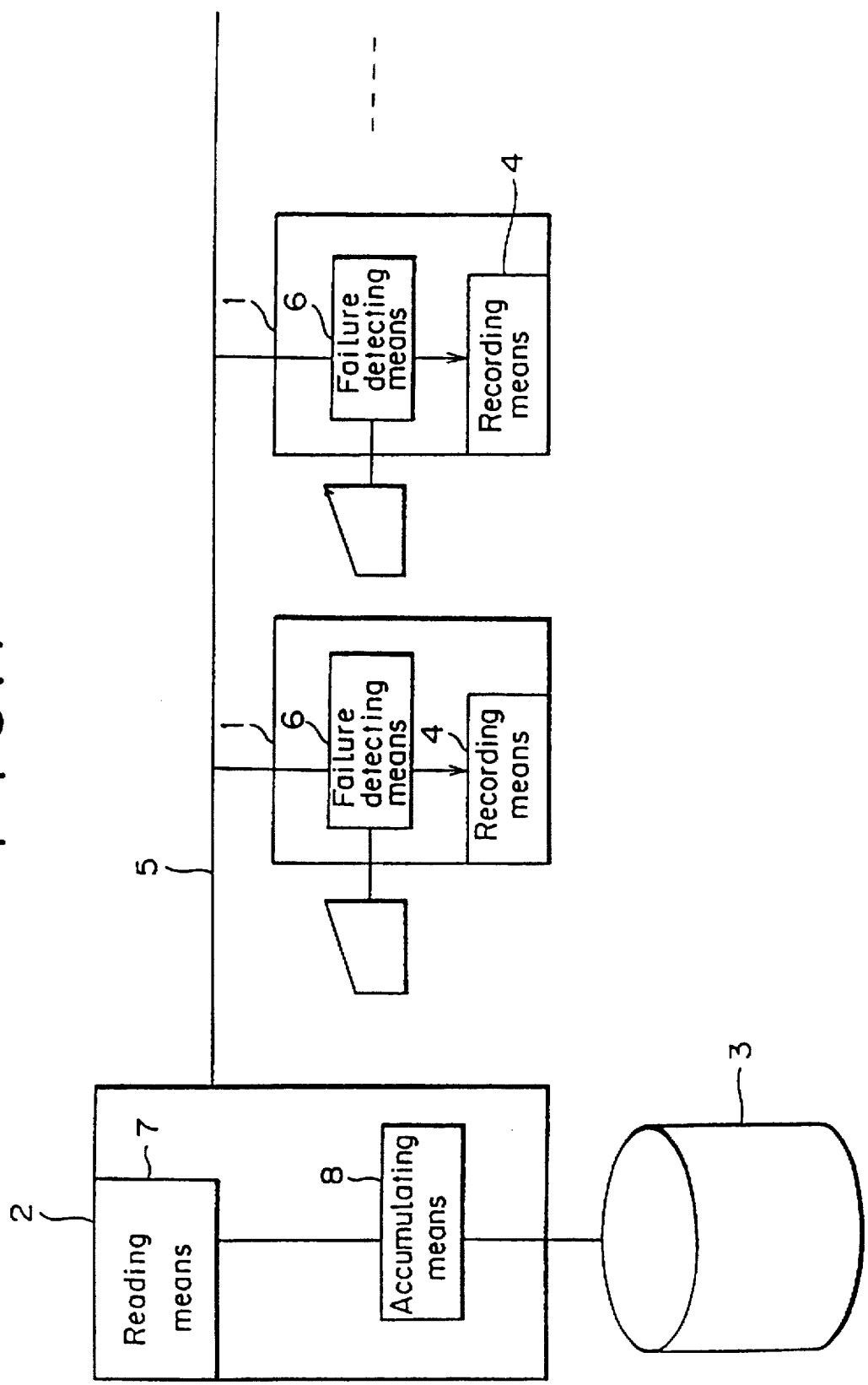
FIG. 1 is a block diagram of one embodiment of the invention, showing how it works.

One embodiment of the business transaction data accumulating system according to the invention will now be described with reference to FIG. 1. In FIG. 1, a plurality of POS terminals 1 are connected via a communication line 5 to a business transaction data accumulating device 2. Each POS terminal 1 comprises a failure detecting means 6 for detecting any failure that may develop on the communication line 5, and a recording means 4 for recording on a suitable medium the business transaction data entered into the terminal if the failure detecting means 6 detects a communication line failure. The business transaction data accumulating device 2 includes a reading means for reading business transaction data from the medium, and an accumulating means 8 for accumulating the business transaction data which the reading means 7 has read from the medium. The accumulated result is stored into a storing means 3.

In normal state, business transaction data entered into each POS terminal 1 is input to the business transaction data accumulating device 2 via the communication line 5. The input data is accumulated by the accumulating means 8 and stored into the storing means 3. As needed, business transaction data is read from a file in the storing means 3 and displayed or printed out to verify the data on the sales having taken place on the premises for the day.

If a failure occurs on the communication line 5, the business transaction data accumulating device 2 cannot accumulate business transaction data coming on-line from each POS terminal 1. In such a case, the failure detecting means 6 in each POS terminal 1 first detects the failure. Based on the result of the detection, the business transaction data entered into the POS terminal 1 is recorded onto the medium by the recording means 4. At the end of a business day, the medium containing the business transaction data is brought to the business transaction data accumulating device 2. There, the recorded business transaction data is read by the reading means 7. After being read from the medium, the business transaction data is accumulated by the accumulating means 8 and stored into the storing means 3.

Embodied as described above, the business transaction data accumulating system according to the invention accumulates the business transaction data entered into each POS terminal 1 even if a failure occurs on the communication line 5 or in the business transaction data accumulating device 2.

Figure 2:
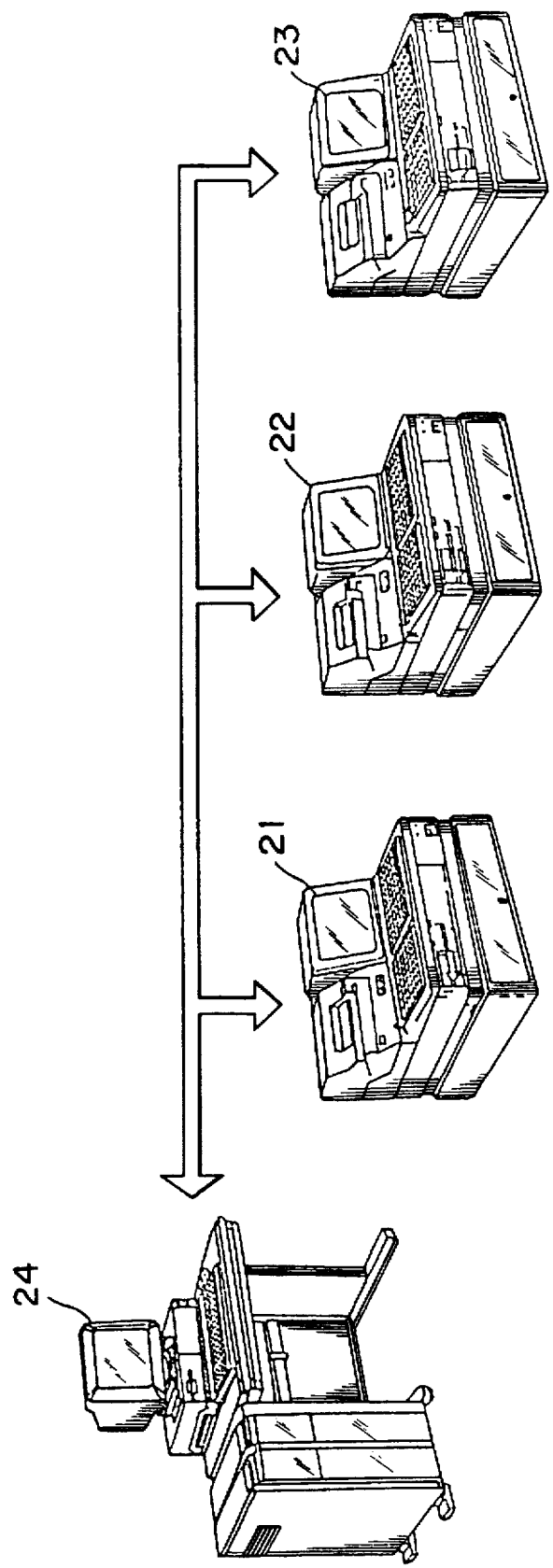
FIG. 2 is a view describing a system configuration of the embodiment.

FIG. 2 shows a typical system configuration of the embodiment. In FIG. 2, POS terminals 21, 22 and 23 are distributed inside a supermarket to process entries of business transaction data. The data entered into the POS terminals 21–23 is sent via the communication line to an accumulating device 24. The accumulating device 24 classifies the business transaction data by product name, by sales period and other relevant criteria, and calculates the sales amounts and quantities for each category established.

Figure 3:
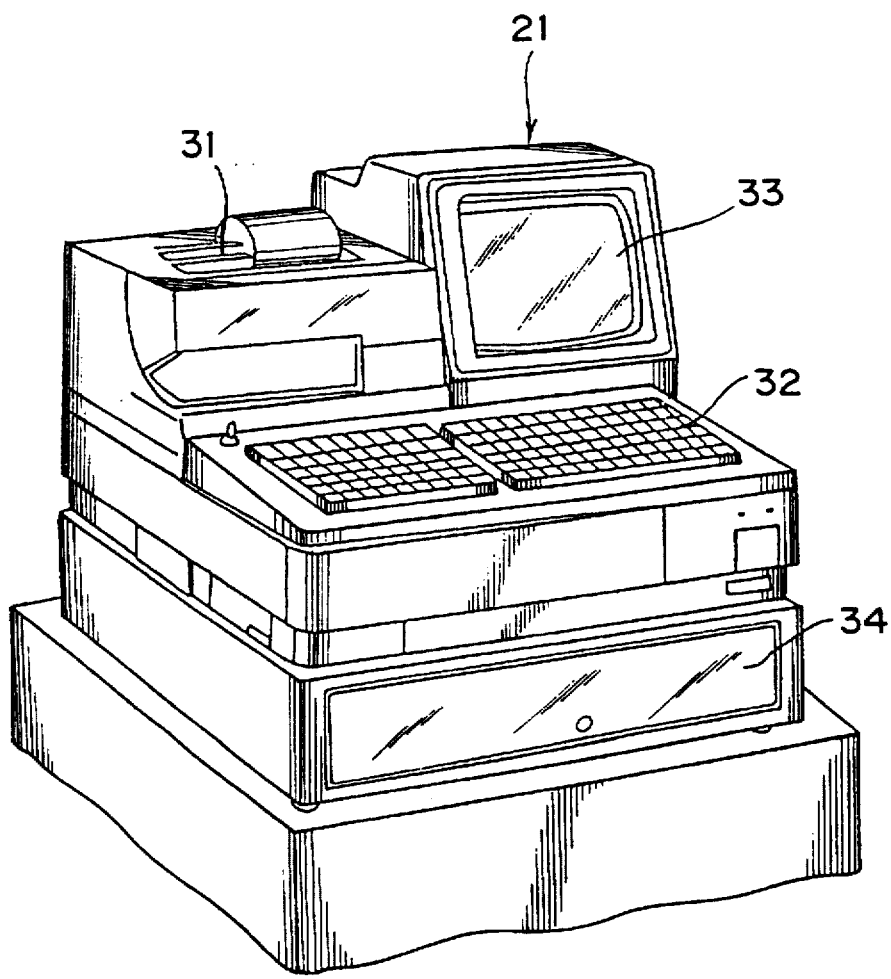
FIG. 3 is a perspective view of a POS terminal for use with the embodiment.

Referring now to FIG. 3, the POS terminal 21 comprises a printer 31, a keyboard 32, a display unit 33 and a drawer 34. The printer 31 prints business transaction data onto the journal sheet and receipt. The keyboard 32 is used to input product prices, quantities sold and other data. The display unit 33 displays the data about the products purchased by customers, the prices and quantities thereof and other data relevant to the transaction. The drawer 34 contains spaces in which to retain the cash received from customers and the change to be given to them.

Figure 4:
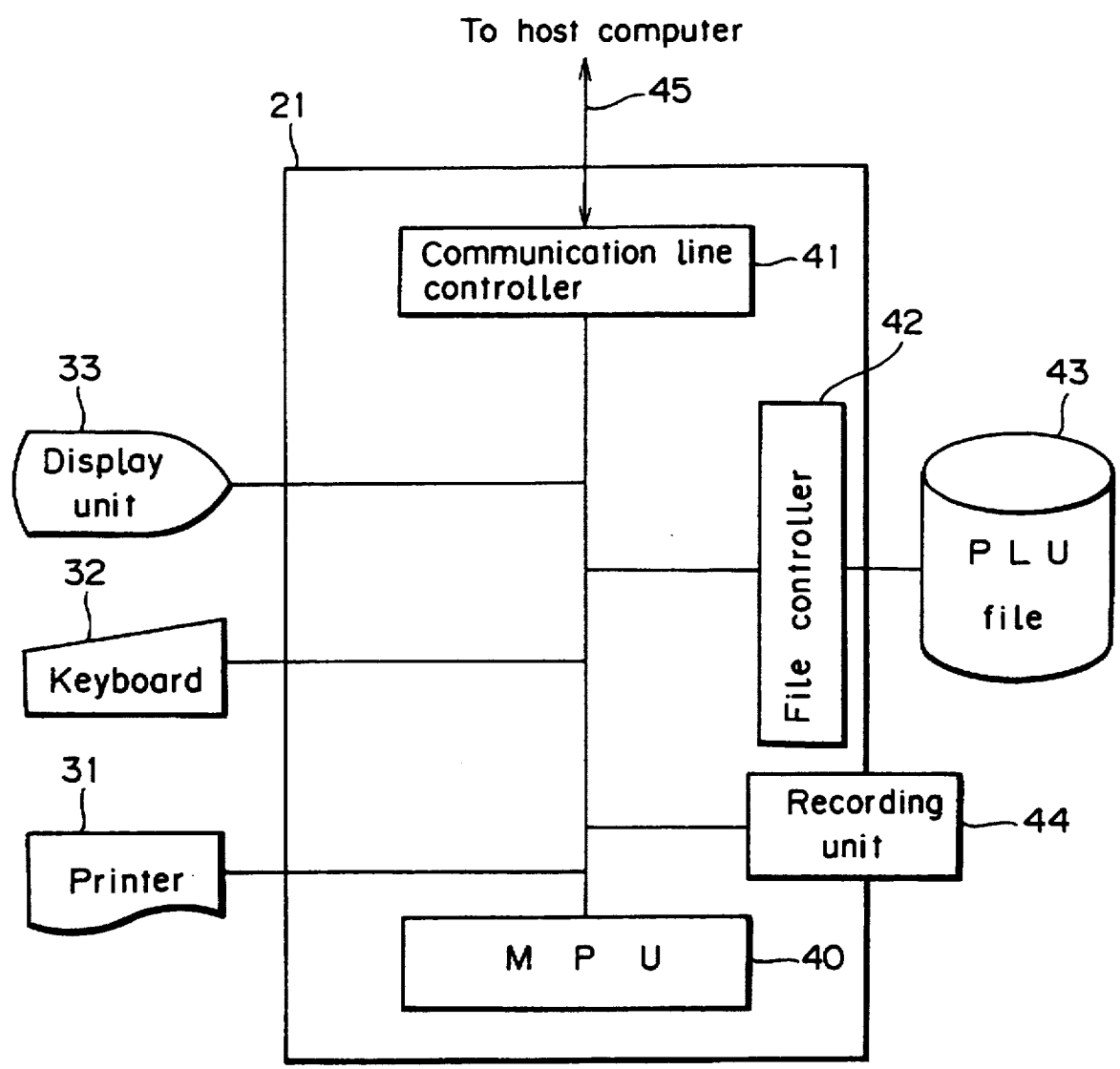
FIG. 4 is a block diagram of the POS terminal.

In FIG. 4, reference numeral 40 is an MPU that controls the POS terminal 21 as a whole. A communication line controller 41 controls a communication line 45 connected to the accumulating device 24. In addition, the communication line controller 41 contains a failure detecting means for detecting any failure that may occur on the communication line 45. The POS terminal 21 is connected to a price lookup (PLU) file 43 in which to store the business transaction data entered through the POS terminal 21. Data is written to or read from the PLU file 43 via a file controller 42. The POS terminal 21 further comprises a recording unit 44 which records the business transaction data entered through the POS terminal 21 upon a communication line failure.

Figure 5:
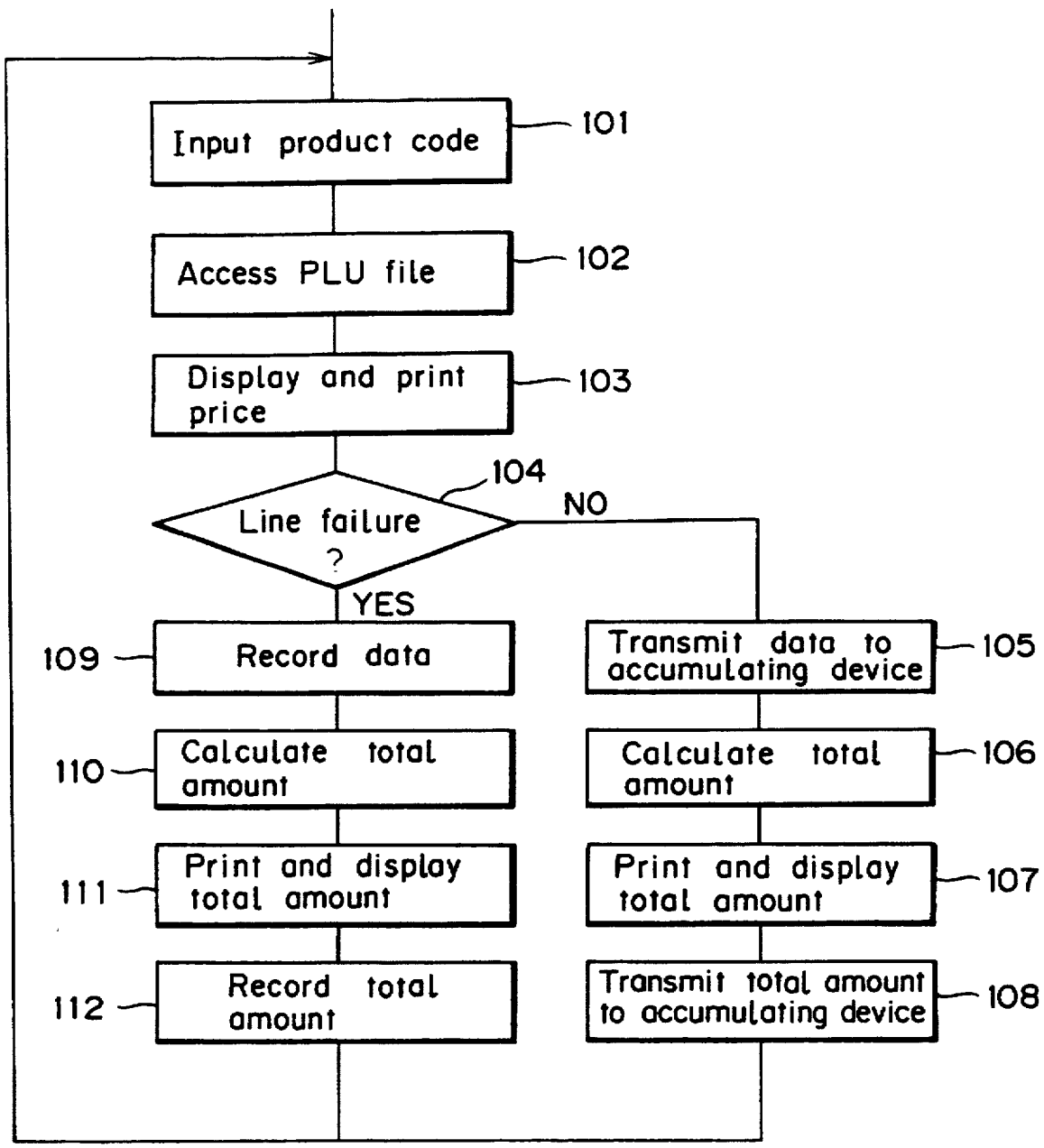
FIG. 5 is a flowchart illustrating how the POS terminal processes data.

How the POS terminal 21 works will now be described with reference to FIG. 5. Illustratively, a customer brings a product he or she wants to buy to a check-out counter where the POS terminal 21 is installed. In step 101, the product code of the product is input by reading a bar code thereon with a bar code reader, not shown, or by operating keys on the keyboard 32. In step 102, the PLU file 43 is accessed through the file controller 42 and looked up based on the product code entered. The price and name of the product are retrieved from the PLU file 43. The sales amount of the purchased quantity of the product is calculated in accordance with the retrieved price and name of the product. In step 103, the calculated result is displayed on the display unit 33 and simultaneously printed on the receipt and journal sheet.

In step 104, a check is made to see if the communication line 45 is normal. If the communication line 45 is found to be normal, the business transaction data is transmitted in step 105 to the accumulating device 24 via the communication line 45. For a plurality of products purchased, the above process is repeated as many times as the number of the products. When data input is completed for all products, a TOTAL key is pushed on the keyboard 32. Pushing the TOTAL key informs the POS terminal 21 that the input of the data on the product or products has ended, and causes step 106 to be reached. In step 106, the POS terminal 21 calculates the total sales amount of the product or products entered. In step 107, the total amount calculated is displayed on the display unit 33 and simultaneously printed on the receipt and journal sheet.

When informed of the total amount, the customer pays in cash, and the employee at the terminal gives him or her any change that may result from the transaction. The receipt paper on which business transaction data is printed is cut to size and handed over to the customer along with the change. The journal sheet is taken up on a reel inside the POS terminal 21 as an in-house record for the establishment. In step 108, the total amount calculated in step 106 is transmitted on-line to the accumulating device 24 via the communication line 45.

If a failure of the communication line 45 is detected in step 104, the business transaction data gathered cannot be sent to the accumulating device 24 over the line. In that case, step 109 is reached in which the business transaction data destined to the accumulating device 24 is recorded instead by the recording unit 44.

The recording unit 44 comprises a tape puncher illustratively installed in the printer 31. In operation, the tape puncher in the printer 31 punches into the journal sheet coded data on products while the same data is also being printed on the journal. That is, the journal sheet doubles as a punched tape. Alternatively, the printer 31 may be used to print bar codes representing the coded data required. This setup makes it possible to record business transaction data with no additional mechanism attached to the terminal.

In step 110, the input of product-related data is repeated as many times as the number of products purchased, and the total amount of all purchased products is calculated. In step 111, the total amount is displayed on the display unit 33 and simultaneously printed on the receipt and journal sheet. In step 112, the total amount is recorded as coded data on the journal sheet by the recording unit 44.

Figure 6:
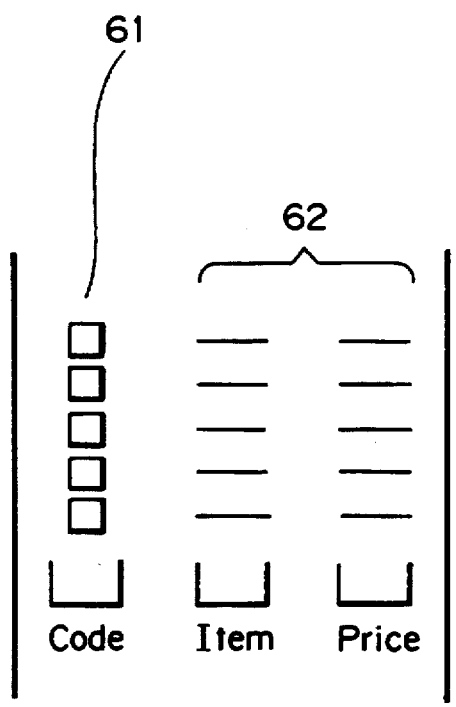
FIG. 6 is a schematic view depicting a journal sheet suitable for use as the medium on which to record business transaction data.

How the journal sheet is structured for use with the embodiment will now be described with reference to FIG. 6. A journal sheet punched by the recording unit 44 contains a code recording area 61 and a business transaction data printing area 62. If there later arises a need to visually check business transaction data, one looks at the business transaction data printing area 62. If it is desired to read business transaction data using the accumulating device 24, the code recording area 61 need only be read. In the foregoing arrangement, a redundant space on the journal sheet is appropriated and business transaction data is punched thereonto to save costs. Alternatively, a dedicated tape punching mechanism may be provided separately.

Figure 7:
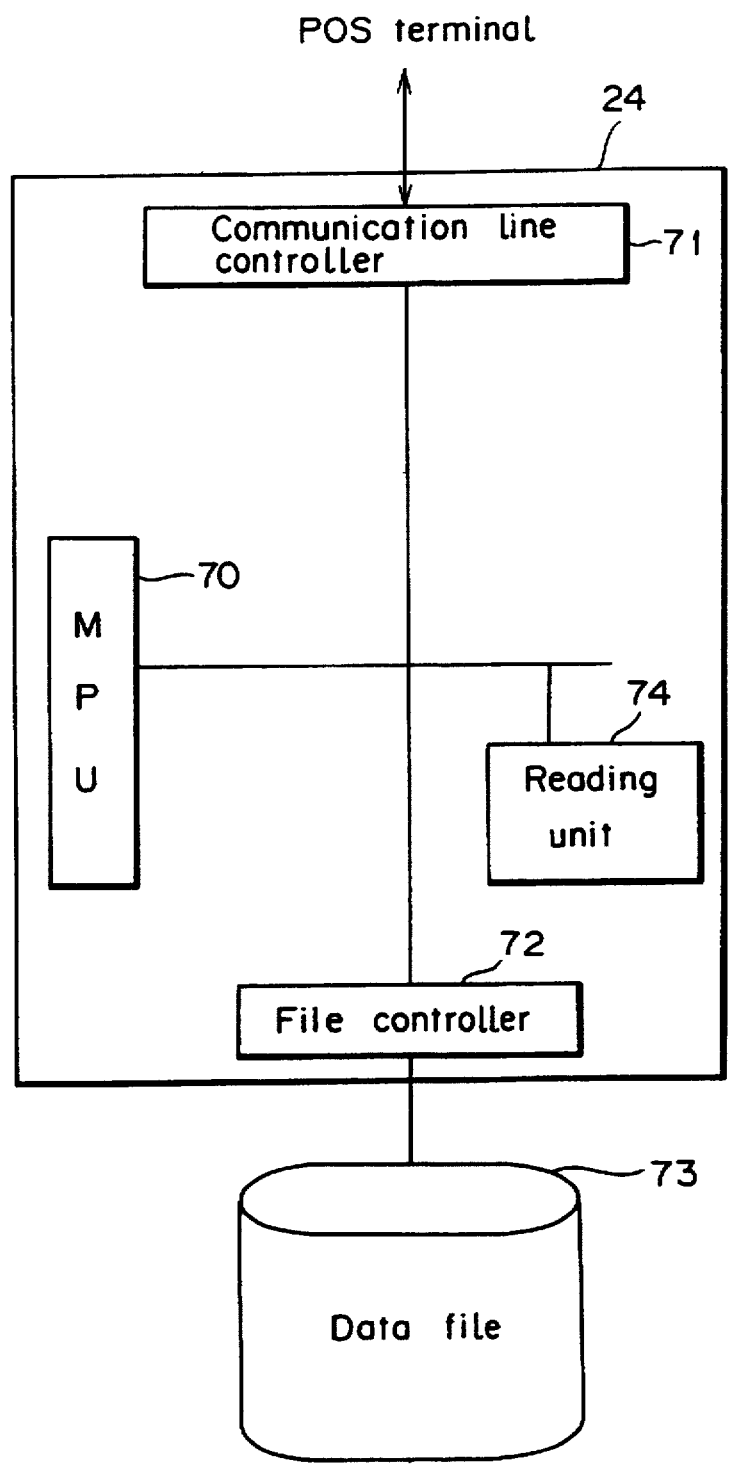
FIG. 7 is a block diagram of an accumulating device used in the embodiment.

How the accumulating device 24 is constructed will now be described with reference to FIG. 7. The accumulating device 24 comprises an MPU 70 that controls the entire device, a communication line controller 71 that controls the communication line 45 attached to the POS terminals 21–23, and a file controller 72 that controls a data file 73 in which to accumulate and store the business transaction data sent from each POS terminal. The accumulating device 24 further comprises a reading unit 74 that reads the business transaction data which was recorded onto the journal sheet by the recording unit 44 of each of the POS terminals 21–23. A punched tape reader illustratively acts as the reading unit 74.

Figure 8:
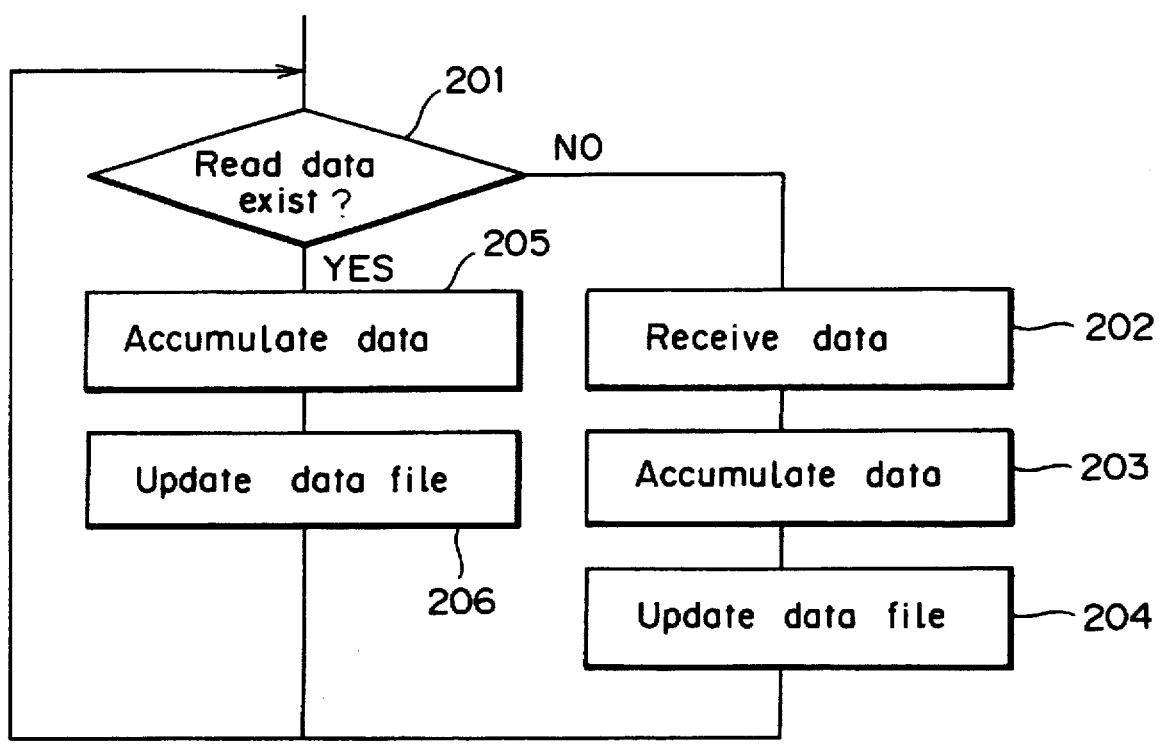
FIG. 8 is a flowchart showing how the accumulating device processes data.

How the accumulating device 24 accumulates business transaction data will now be described with reference to FIG. 8. In step 201, a check is made to see if any business transaction data is input from the reading unit 74. If no data is found to be input from the reading unit 74 and if the communication line 45 is functional, step 202 is reached. In step 202, the business transaction data transmitted over the communication line 45 is received by the communication line controller 71. In step 203, the business transaction data is accumulated by the MPU 70. In step 204, the business transaction data is stored into the data file 73 by the file controller 72. That is, the existing sales data in the data file 73 is supplemented by the quantities and sales of the products sold.

If a failure on the communication line 45 makes it impossible for the POS terminal to transmit business transaction data to the accumulating device 24, the terminal utilizes its recording unit 44 to record the data. At a designated point in time (e.g., at the end of a day's business), an employee brings to the accumulating device 24 the journal sheet on which the business transaction data is recorded. The punched tape reader constituting the reading unit 74 reads hole patterns punched on the journal sheet.

Thereafter, a check in step 201 reveals that there exists data coming from the reading unit 74. Then step 201 is followed by step 205 in which the MPU 70 of the accumulating device 24 accumulates the read data in the same manner as the data received over the communication line 45. In step 206, the data file 73 is updated by use of the accumulated data.

For a plurality of data items read by the reading unit 74, the foregoing process is repeated as many times as the number of the data items. With its data read out, the journal sheet is set aside for storage as usual.

To sum up, the business transaction data accumulating system according to the invention has any of its POS terminals record onto a suitable medium the business transaction data it received if a communication line failure occurs between the terminal and a business transaction data storing means of the system, the recorded data being subsequently read from the medium by an accumulating device of the system for normal data accumulation. This scheme provides a reliable business transaction data accumulating system having a backup arrangement that provides against failures.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A business transaction data accumulating system comprising:

a plurality of business transaction data entry means for entering of data about business transactions, and for outputting said entered data;

a business transaction data accumulating means for accumulating the business transaction data entered through any of said business transaction data entry means; and a communication line for connecting said plurality of business transaction data entry means to said business transaction data accumulating means and for transmitting said entered data to said business transaction data accumulating means, wherein each of said business transaction data entry means includes a failure detecting means for detecting any failure that occurs at least on said communication line prior to said business transaction data entry means outputting said data, and a recording means for recordings, on a recording medium, the business transaction data entered through said business transaction data entry means upon detection of any failure by said failure detecting means.

2. A business transaction data accumulating system according to claim 1, wherein said business transaction data accumulating means includes:

a reading means for reading business transaction data from said medium; and an accumulating means for accumulating the business transaction data which said reading means has read from said medium.

3. A business transaction data accumulating system according to claim 2, wherein each of said business transaction data entry means further includes a printing means for printing business transaction data, and wherein said recording means is a punching means for punching coded data onto a sheet of paper on which said printing means also prints business transaction data.

4. A business transaction data accumulating system according to claim 3, wherein said sheet of paper is a journal sheet containing a code recording area and a product data printing area.

5. A business transaction data accumulating system according to claim 2, wherein said recording means is a printing means for printing bar code data onto a sheet of paper.

6. A business transaction data accumulating system according to claim 3, wherein said reading means is a punched tape reader.

* * * * *